Figure 1:
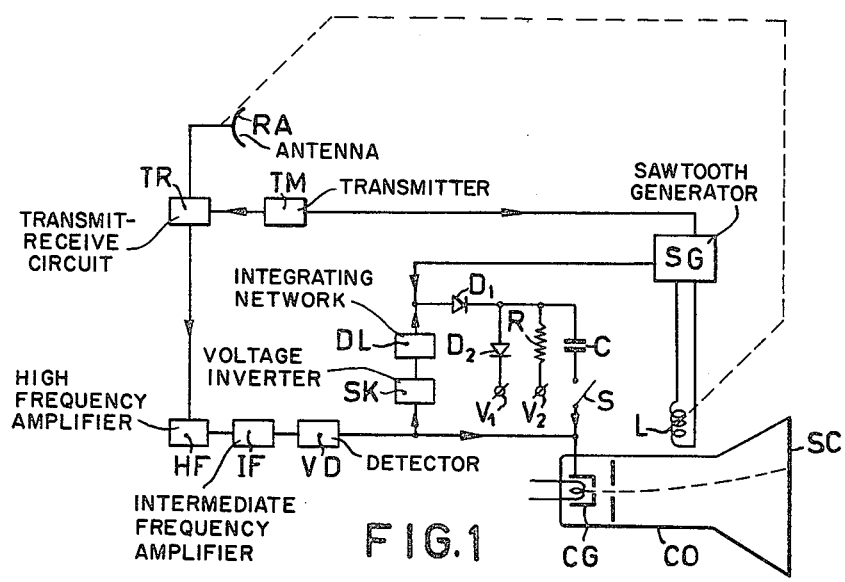

June 8, 1965 J. M. G. SEPPEN 3,188,638
TUNING INDICATOR FOR RADAR RECEIVER-TRANSMITTERS
Filed Dec. 18, 1961

INVENTOR
JOAN M.G. SEPPEN
BY
AGENT

3,188,638
TUNING INDICATOR FOR RADAR RECEIVER-TRANSMITTERS

Joan Maarten George Seppen, Hilversum, Netherlands, assignor to North American Philips Company, Inc., New York, N.Y., a corporation of Delaware
Filed Dec. 18, 1961, Ser. No. 159,846
Claims priority, application Netherlands, Jan. 13, 1961, 260,046
7 Claims. (Cl. 343—17.7)

The invention relates to a tuning indicator for a radar receiver-transmitter. Such apparatus generally comprises a cathode-ray oscillograph having a long-glow screen for displaying radar echos received in a panoramic picture.

In practice a device is required which permits of checking, during normal operation, whether the receiver, which may comprise an input amplifier including a klystron, is satisfactorily tuned to the frequency of the emitted radar pulses, which may be produced by a magnetron. The difficulty arises that the radar pulses are comparatively short. In analogy to the known tuning indicators in radio receivers, the video signals of the radar receiver may be applied to a magic eye or a measuring instrument, so that the intensity of the signals is a measure of the degree of accuracy of the tuning. However, the intensity of the echo signals varies comparatively rapidly with time, first, because in a certain direction a train of echo pulses of different intensities reflected by different objects occurs, and second because on rotation of the antenna in different directions different echos are received. The rapid fluctuations may be obviated by supplying the signals to the indicator through a suitable low-pass filter or a filter tuned to the pulse repetition frequency, so that the mean intensity of the echo signals in a certain direction is effectively measured. This method is not suitable for use in operation with rotating antenna, because very large variations of the mean intensity of the echos from different directions may occur and, furthermore, if the time constant of the low-pass filter is made so large that these variations are also smoothed out, the indication becomes too slow. This adversely affects rapid adjustment of the receiver.

The present invention provides an efficacious solution of the problem. In the tuning indicator according to the invention means are provided to trace a figure on the screen of the oscillograph such that in each direction the figure is spaced from the center of the screen by a distance proportional to the entire signal energy received in the respective direction.

Figure 2:
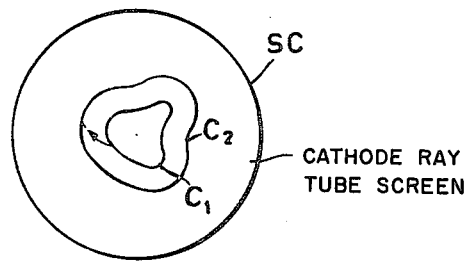

The invention will now be explained more fully with reference to the drawing, in which:

FIG. 1 is a block diagram of a radar system and illustrating the tuning indication circuit of the present invention; and FIG. 2 is an illustration of the screen of a cathode-ray tube showing the type of presentation provided by the system of FIG. 1.

FIGURE 1 is a block-schematic diagram of a radar transmitter-receiver, comprising a radar transmitter TM which supplies radar pulses to a rotary antenna RA through a transmitter-receiver circuit TR. The echo signals received are applied through the transmitter receiver circuit TR to a high-frequency amplifier HF of the receiver and, after further amplification in an intermediate-frequency amplifier IF, detected by a detector VD to form a video signal. The video signal is applied to an intensity control electrode CG of a cathode-ray oscillograph CO shown diagrammatically. When the electron beam is not suppressed under the control of the voltage at the electrode CG, it is periodically deflected radially from the center under the control of a sawtooth current supplied by a sawtooth generator SG to a magnetic deflection coil L of the tube. The deflection coil L is mounted for rotation about the neck of the tube and is driven in synchronism with the aerial in known manner by means not shown in the drawing, so that always a certain position of the coil L corresponds to a definite direction of the antenna. When the electron beam is periodically deflected, a fan-shaped line image would be produced if the beam were not suppressed. The sawtooth generator CG is synchronized by the transmitter TM so that at each transmitter pulse the generator SG is rendered operative to deflect the beam. Owing to the fact that the electron beam is emitted and not suppressed at each echo signal under the control of the video signals applied to the control electrode CG, a panoramic picture is produced in known manner on the screen SC of the tube.

When the tuning of the receiver has to be checked, an indicator figure is superposed on the panormaic picture on the screen SC so that in each direction the distance by which this figure is spaced from the center is proportional to the "echo content" in the respective direction. That is to say, the displacement from the center is proportional to the mean intensity of the echo signals. The indicator figure is applied to the cathode-ray tube by closing a switch S.

The output of the video detector VD is connected, through a voltage inverter SK and an integrating network DL, to a terminal of a rectifier D1, to which is also applied a sawtooth voltage by the generator SG. The other terminal of the rectifier D1 is connected, through a rectifier D2 and a resistor R, to suitable voltage sources V1 and V2 and also, through a capacitor C and the switch S, to the control electrode CG of the cathode ray tube CO. The polarity of the output voltage of integrating network DL is such that the rectifier D1 is cut off, while the sawtooth voltage is operative in the opposite direction. At the beginning of each scanning cycle, that is to say immediately after each transmitter pulse, the sawtooth volage has a small value so that the rectifier D1 is cut off. When the sawtooth voltage reaches a value the absolute value of which is equal to the output voltage of the integrating network DL, the rectifier D1 is rendered conductive with the result that a positive pulse is applied, through the capacitor C and the switch S, to the control electrode CG, so that an electron beam is emitted and a luminous spot is displayed on the screen SC. Shortly after the rectifier D1 has become conductive, the rectifier D2 is rendered conductive, so that the voltage of the junction is no longer increased and hence the duration of the pulse is limited. The instant at which the pulse occurs depends upon the value of the output voltage of the integrating network DL, the pulse being produced at a later instant and consequently the spot on the display screen being spaced from the center by a greater distance as the output voltage is higher.

FIGURE 2 shows two examples of indicator curves C1 and C2 on the screen SC. The panoramic picture, which remains visible, is omitted for the sake of simplicity. The curves C1 and C2 have the same shape. It is assumed that first the curve C1 appears which corresponds to incorrect tuning of the receiver. If the tuning of the receiver is now changed in one direction or the other, the figure will become larger or smaller according to whether the alteration is in the correct or in the wrong direction. The screen CS has a comparatively long afterglow, so that both the newly traced curve and the previously traced curve are visible. Hence, during the tuning the figure moves outwardly or inwardly with respect to the persistent image, so that a sharp indication is obtained at each instant. The receiver is now tuned so that the size of the indicator figure is a maximum and, for example, a curve C2 is produced. When the tuning of the receiver is correct, changes in tuning in one direction or the other will cause a reduction in the size of the figure.

What is claimed is:

1. In a radar system of the type having a cathode-ray tube with a screen and an electron gun for directing an electron beam to said screen, a source of video radar signals connected to said electron gun to modulate said beam, a source of sawtooth signals, and means connected to said source of sawtooth signals for deflecting said beam to provide a plan position indicator type of scan of said beam on said screen, means for indicating the tuning of said radar system on said screen, said last-mentioned means comprising means connected to said source of video signals for providing a control signal having an amplitude dependent upon the mean intensity of echo signals received by said system from a given direction, means comparing said sawtooth signal and control signal to provide an output pulse which occurs at a time with respect to the beginning of the cycle of said sawtooth signal that is dependent upon the amplitude of said control signal, and means applying said output pulse to said electron gun, whereby a spot occurs on said screen that is displaced from the center of the screen at a distance that is a fraction of the tuning of said system.

2. A tuning indicating system for a radar transceiver, comprising an image reproducing device having a screen, a source of echo signals, means for applying said echo signals to said device, deflection means connected to said device for forming a panoramic image on said screen with said echo signals being displayed on traces originating at a common origin, said deflection means comprising a source of sawtooth signals, means for integrating said echo signals, means for comparing the amplitude of said sawtooth signals and said integrated signals to provide a pulsatory signal in which the pulses occur at times subsequent the beginning of cycles of said sawtooth signals which vary as a function of the amplitude of said integrated signals, and means for applying said pulsatory signal to said device.

3. A tuning system for a radar transciever, comprising a cathode-ray tube having a screen and an electron gun for directing an electron beam to said screen, a source of echo signals, means for applying said echo signals to said electron gun, means comprising a source of sawtooth signals for deflecting said electron beam to form a panoramic image on said screen with said echo signals being displayed on traces originating at a common origin, means for integrating said echo signals, means for comparing the amplitudes of said sawtooth signals and said integrated signals to provide a pulsatory signal in which pulses occur at times subsequent the beginning of cycles of said sawtooth signals which vary as a function of the amplitude of said integrated signals, and means for applying said pulsatory signals to said electron gun, whereby a figure is displayed on said screen in which the distance from said origin to said figure along said traces is proportional to the integrated signal energy received in the respective direction.

4. The system of claim 3, in which said means comparing the amplitudes of said sawtooth and integrated signals comprises a gate circuit, and means applying said integrated signals and sawtooth signals to said gate circuit with opposite senses.

5. The system of claim 4, comprising limiter means connected to the output of said gate circuit.

6. The system of claim 3, in which said means comparing the amplitudes of said sawtooth and integrated signals comprises a diode having first and second electrodes, a source of potential, resistor means connecting said source of potential to said first electrode, means applying said sawtooth signals and integrated signals to said second electrode, and capacitor means connecting said first electrode to said electron gun.

7. The circuit of claim 6, comprising a second diode having third and fourth electrodes, a second source of potential, means connecting said third electrode to said second source, and means connecting said fourth electrode to said first electrode, said first and fourth electrodes being of the opposite type, whereby the amplitude of said pulsatory signals is limited.

References Cited by the Examiner

UNITED STATES PATENTS

| | | | |
|---|---|---|---|
| 2,295,412 | 9/42 | Little | 343—118 |
| 2,334,247 | 11/43 | Busignies | 343—118 |
| 2,513,962 | 7/50 | Patterson | 343—11 |

CHESTER L. JUSTUS, *Primary Examiner.*